W. H. WATKINS.
TRACTOR FOR AERIAL ROPEWAYS AND THE LIKE.
APPLICATION FILED OCT. 28, 1918.

1,313,358.

Patented Aug. 19, 1919.
8 SHEETS—SHEET 7.

INVENTOR
W. H. Watkins
By M. Olhau
Atty

W. H. WATKINS.
TRACTOR FOR AERIAL ROPEWAYS AND THE LIKE.
APPLICATION FILED OCT. 28, 1918.

1,313,358.

Patented Aug. 19, 1919.
8 SHEETS—SHEET 8.

INVENTOR
W. H. Watkins
By
Atty

UNITED STATES PATENT OFFICE.

WILLIAM HUGH WATKINS, OF HANWELL, ENGLAND.

TRACTOR FOR AERIAL ROPEWAYS AND THE LIKE.

1,313,358.  Specification of Letters Patent.  Patented Aug. 19, 1919.

Application filed October 28, 1918. Serial No. 260,041.

*To all whom it may concern:*

Be it known that I, WILLIAM HUGH WATKINS, a subject of the King of Great Britain and Ireland, and a resident of Hanwell, county of Middlesex, England, have invented certain new and useful Improvements in Tractors for Aerial Ropeways and the like, of which the following is a specification.

The present invention therefore has reference to and comprises improvements in tractors for aerial ropeways and the like for transporting purposes; the transportation of loads being accomplished by a self-powered tractor carrier, providing for its own propulsion and traction for attendant or other load carriers, and adapted for automatic control of traveling on a system or series of supported and continuous spans of elevated rope track, or the straight, curved, or inclined rigid rail, which may form part of the track system.

A tractor is so constructed and arranged as to negotiate or travel past the track-supporting standards and to be under automatic control when mounting and descending the distorted, in the loaded sense, catenaries of the system series of elevated spans of rope track, and to provide for its own propulsion and for traction for other load-bearing carriers, one or more such carriers conveniently accompanying a tractor by being coupled and connected by a load beam thereto, and if it is so desired, an attendant or operator may travel with the tractor, means being provided for slinging an inclosed platform therefrom, and the tractor may carry by the same provision any form of accessory for handling loads, a hoisting winch, for instance, but such accessories, however, do not form part of the present invention.

The tractive motor power employed in the present instance is that provided by an internal combustion engine, but it will be readily understood that other systems of motive power can be employed and likewise automatically controlled by the means provided, and therefore, I do not confine my invention to any particular system or type of motive power. The said motive power agent together with its latent energy supply or power generator and the control gear therefor, form an integral part of the tractor, and provides the required motive power for its propulsion and for traction. The motive power agent conveniently mounted on or forming part of an under-structure or hanger pivotally depending from and borne by the carriage of the tractor, is automatically controlled as the tractor mounts or descends an elevated span of rope track, by the relative positions to each other of the aforesaid carriage and the depending hanger, regulating the power supply and also operating a track brake through suitable lever gear.

Associated with the above is a centrifugal brake on the power shaft and an automatic free power clutch on the carriage, and the beforementioned control gear together with the free power clutch, is also arranged to be automatically operated by engaging, during the passage of the tractor, suitable means mounted on the carrying rope supports, and, if so desired, the control gear may be manually manipulated. In order that the control gear shall be effectual and not be affected by any undue oscillation of the depending hanger, one or more dashpots are employed to arrest or damp idle swinging and too sudden movements of the hanger.

The tractor is propelled by driving the traveling wheels of the carriage thereof through suitable gearing from the motive power agent, or, alternatively, the carriage is provided with one or more power-driven sprocket wheels or their equivalents which engage with the linking pins or equivalents or an endless chain or band forming a self-laying track which is grooved to engage with and travel on the track rope, thus providing the maximum of frictional contact surface to enhance the life of the track rope, while insuring propulsion and providing for traction. Or, as a further alternative, instead of propelling the tractor wholly by frictional contact of the track rope, the tractor is drawn by the motive power agent thereof, driving through suitable gearing one or more warping sheaves or their equivalents rotatably mounted in the carriage, with which engages, by a part coil or coils, a light hauling rope extending throughout the length of the track system; the powered rotation of the warping sheaves providing propulsion by winding on and off the hauling rope, the said hauling rope, which is continuous and of light section and flexibility, is carried adjacent to the track by resting on the crossheads of the standards.

The actual engaging contact surfaces and treads of the traveling wheels, or, alternatively, of the self-laying track, with the track rope, and of the warping sheaves with the hauling rope, to augment propulsion and traction, may have incorporated therewith a frictional component, such as "ferodo," a well-known fabric having a high co-efficient of friction.

And in order that others may clearly understand how my invention is carried into effect and practice, reference is to be had to the following description and the hereunto appended eight sheets of drawings, in which:—

Figure 1:
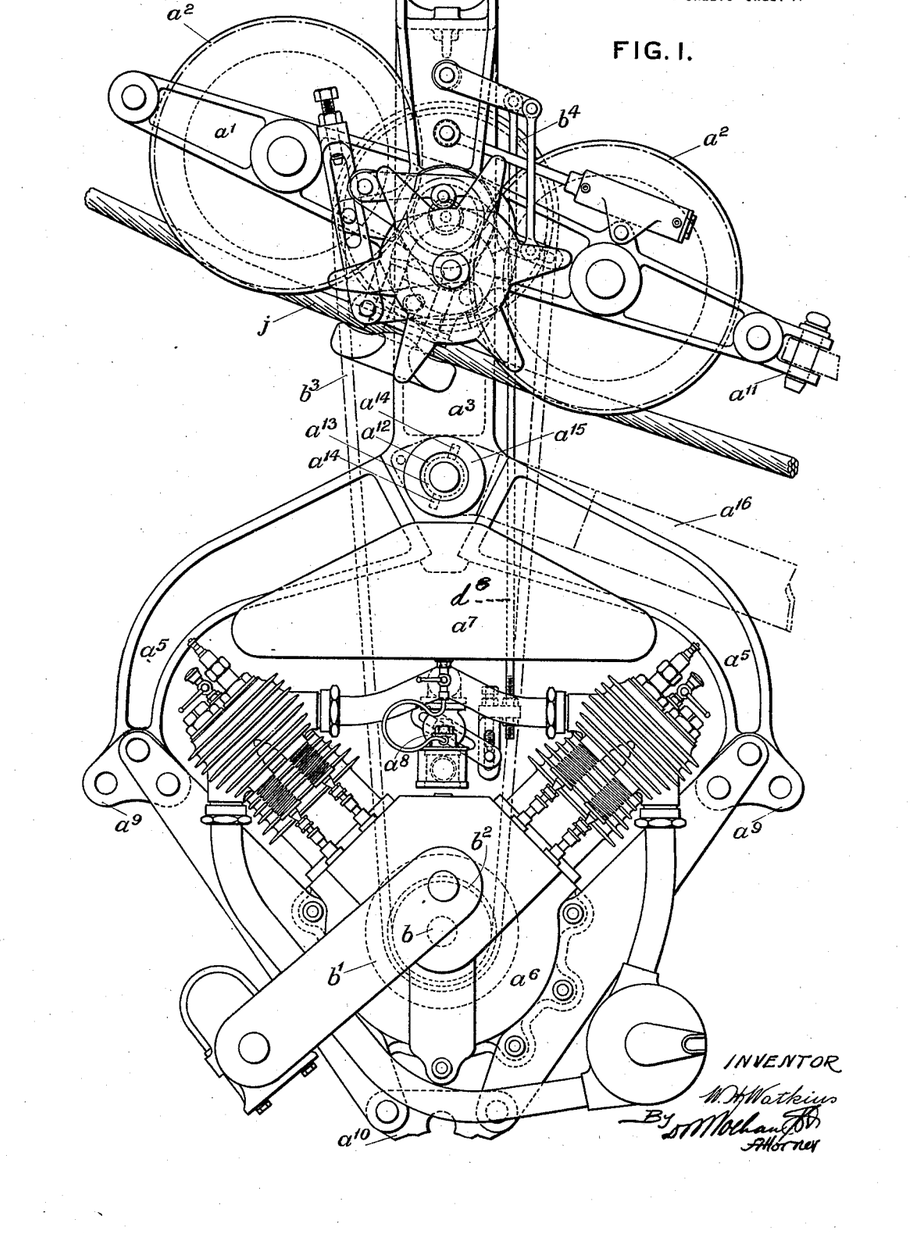
Figure 1 is a side elevation of a tractor complete, shown ascending an incline.
Figure 2:
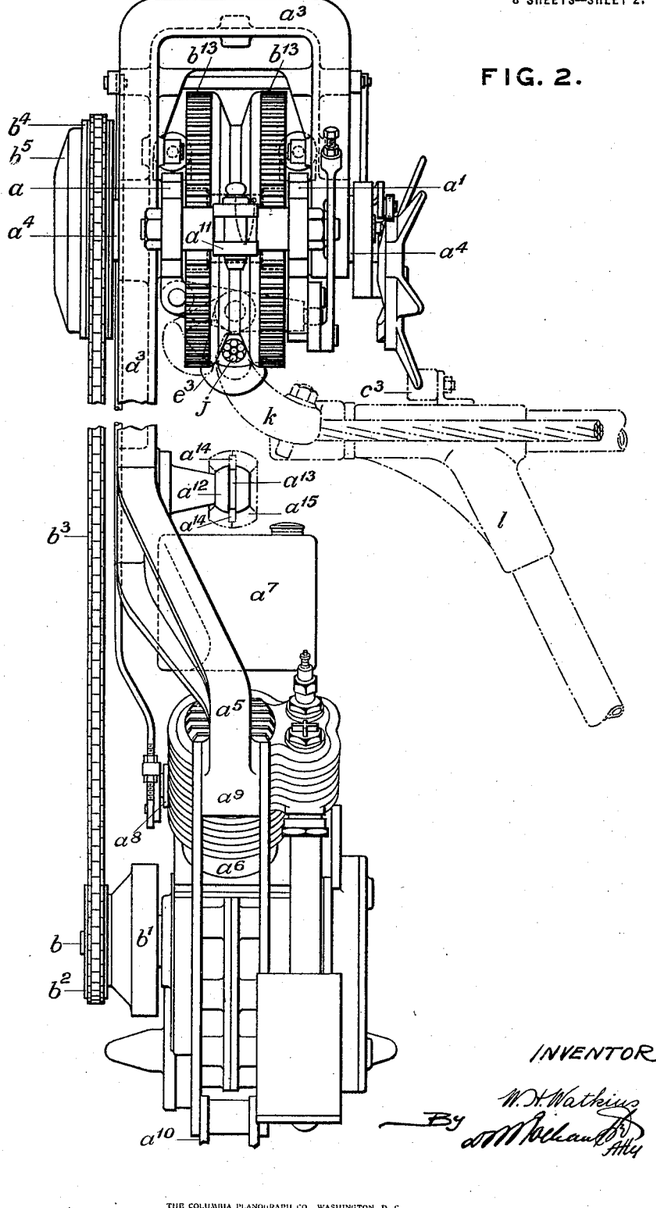
Fig. 2 is an end elevation of a tractor complete, shown negotiating a track support.

Referring to these drawings, in which like letters of reference indicate corresponding parts in the several figures, and referring first to the arrangement of a tractor,—Figs. 1 and 2,—the tractor carriage, designated by its side frames $a$, $a^1$, is mounted by its powered traveling wheels $a^2$ on the rope track $j$ and bears a depending hanger $a^3$ pivotally from the central pivots $a^4$ of the carriage frame $a$, $a^1$; said hanger $a^3$ being depended to one side only of the track rope $j$ to enable the tractor to negotiate the track-supporting elements, and also depending in such a manner as to insure that the centers of gravity and area of the complete tractor shall lie vertically beneath the center of the track, and borne centrally to the carriage $a$, $a^1$ so as to compensate and distribute the forces transmitted thereby to the power-driven traveling wheels $a^2$: the said hanger $a^3$ carries the understructure $a^5$ and the motive power agent $a^6$ together with its power generator, or, alternatively, its latent energy supply $a^7$ and the power controlling agent $a^8$.

I do not confine myself to the particular form of, or the manner described of connecting the depending hanger $a^3$ to the carriage $a$, $a^1$; as I may use any other suitable form of hanger, and may connect it in any other suitable way.

The provision of the eyes $a^9$ and eye $a^{10}$ is for the purpose, if so desired, of slinging loads being carried by the tractor itself, affixing an operator's platform, or for the attachment of an accessory for handling loads, such as a hoisting winch. The tractor is provided with a drawbar coupling $a^{11}$ with provision for universal movement, the draw bar constituting the tractive connection to a carrier when attendant. Provision is also made for an independent and auxiliary connection by a lower spherical trunnion coupling $a^{12}$ having a turned groove $a^{13}$ in which engages the opposed pins $a^{14}$ of the trunnion-incasing member $a^{15}$ forming the coupling and end piece of a load-carrying beam $a^{16}$ for the suspension of the loads to be transported when connecting one or more attendant load-bearing carriers. The couplings $a^{11}$ and $a^{12}$ permit of the tractor and attendant carriers to negotiate horizontal and vertical curves and changes of direction in the track, as when passing an oscillating saddle $k$, or when traversing a terminal curve of rigid rail.

The driving spindle $b$ of the motive power agent $a^6$ has secured thereon a centrifugal brake $b^1$ and a sprocket pinion $b^2$ which drives, by means of a silent chain $b^3$, the sprocket wheel $b^4$, which silent chain drive $b^2$, $b^3$ and $b^4$ is not claimed.

Figure 3:
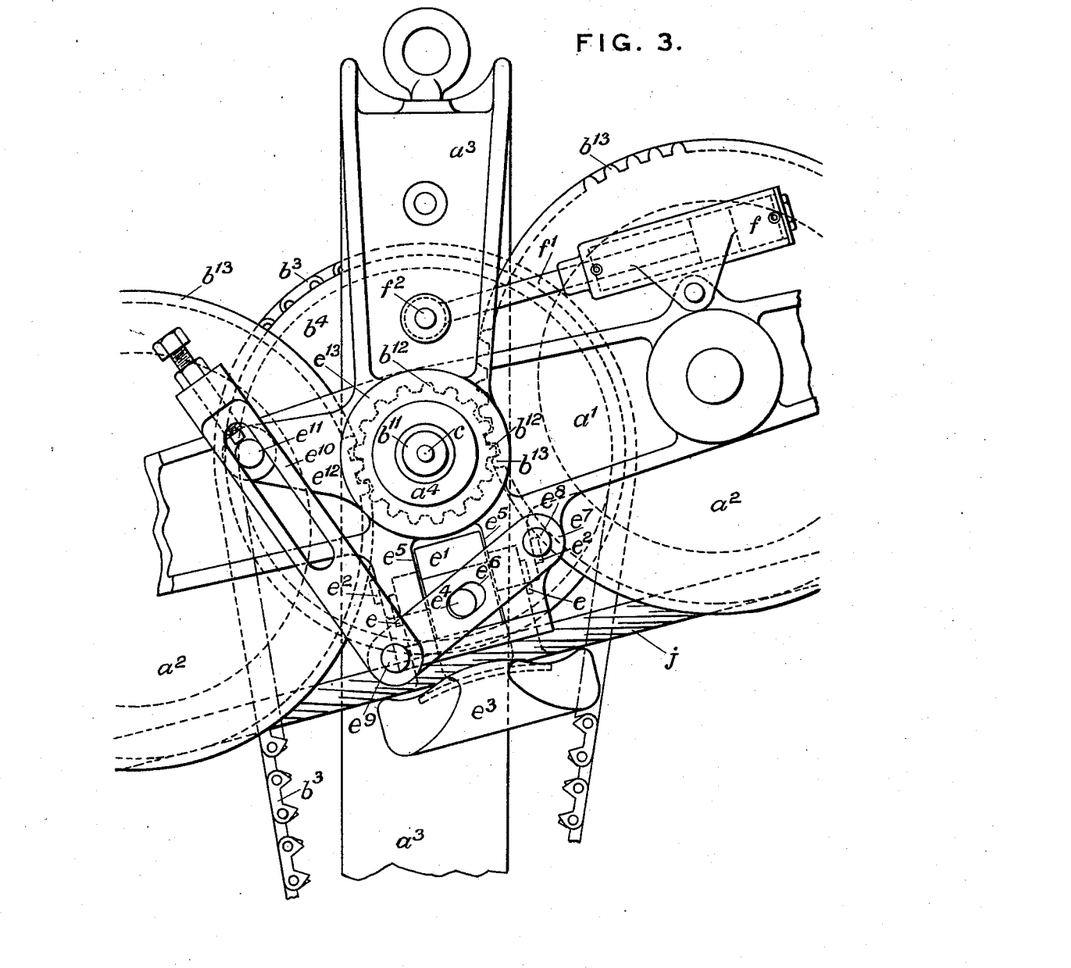
Fig. 3 is a part side elevation to an enlarged scale, showing the tractor descending a decline; this illustration has certain details omitted for more clearly defining the gearing up of the traveling wheels, the dashpot means for preventing idle and too sudden oscillatory movements of the depending hanger, and also the means for automatically braking tractor carriage to underside of track elements.
Figure 4:
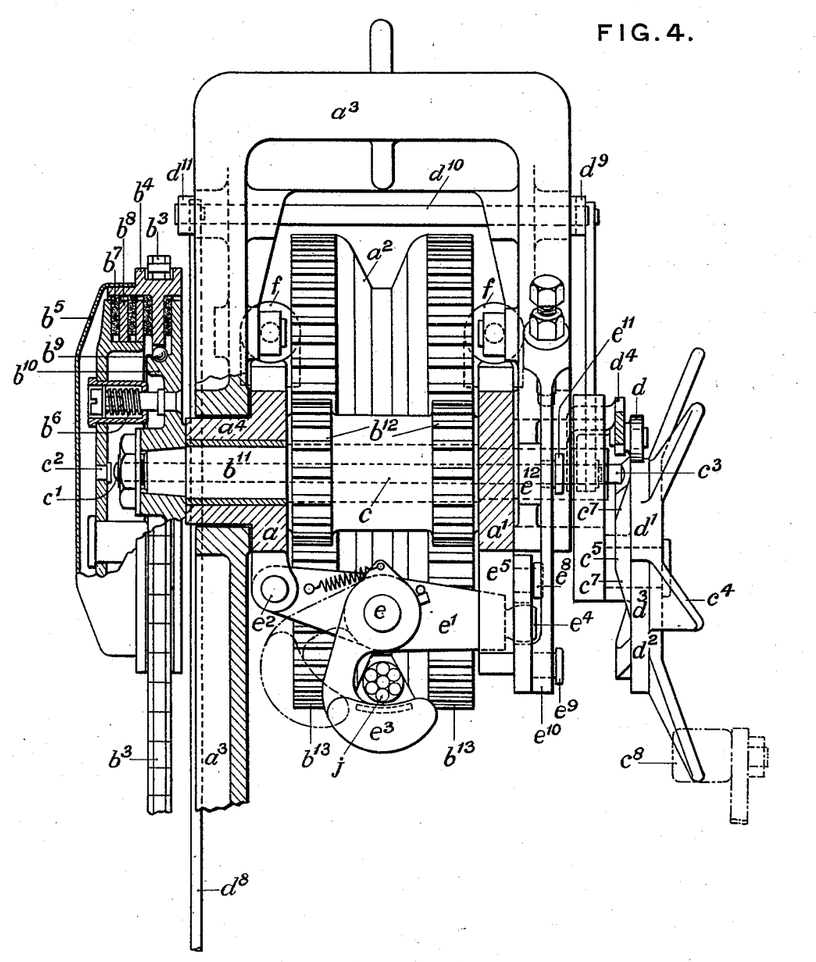
Fig. 4 is a part transverse sectional elevation of the carriage, also to an enlarged scale, showing the said braking means, one of the pivotal bearings of the depending hanger, the central pinion and its hollow shaft containing a push rod, the means for actuating said rod for disconnecting or connecting the power-driven and driving elements of the tractor, and the means whereby the slipper brake is arranged and enabled to clear a track support.

Referring now to Figs. 3 and 4, the said sprocket wheel $b^4$ forms the driving part with a casing $b^5$ of an automatically operated spring influenced frictional clutch, of which one spring only $b^6$ is indicated, which clutch, being of the interposed frictional rings $b^7$, $b^8$ variety, and of universal application, is not claimed. Said driving part of the clutch is mounted by a ball race $b^9$ on the inner and driven part $b^{10}$ of the clutch, and is secured to the hollow shaft $b^{11}$ to which is made fast the central pinion $b^{12}$ gearing with the spur wheels $b^{13}$ of both of the traveling wheels $a^2$, thus completing the gearing up of the motive power agent $a^6$ when both driving and driven parts $b^4$, $b^5$ and $b^{10}$ are under the spring influenced frictional contact of the interposed friction rings $b^7$, $b^8$.

I do not confine myself to the particular form of, or the manner described of gearing up the motive power agent $a^6$ to the traveling wheels $a^2$; as I may use any other suitable form of gearing, and I may also gear the traveling wheels $a^2$ on the outside of the carriage $a$, $a^1$, instead of between the side frames $a$ and $a^1$.

Figure 5:
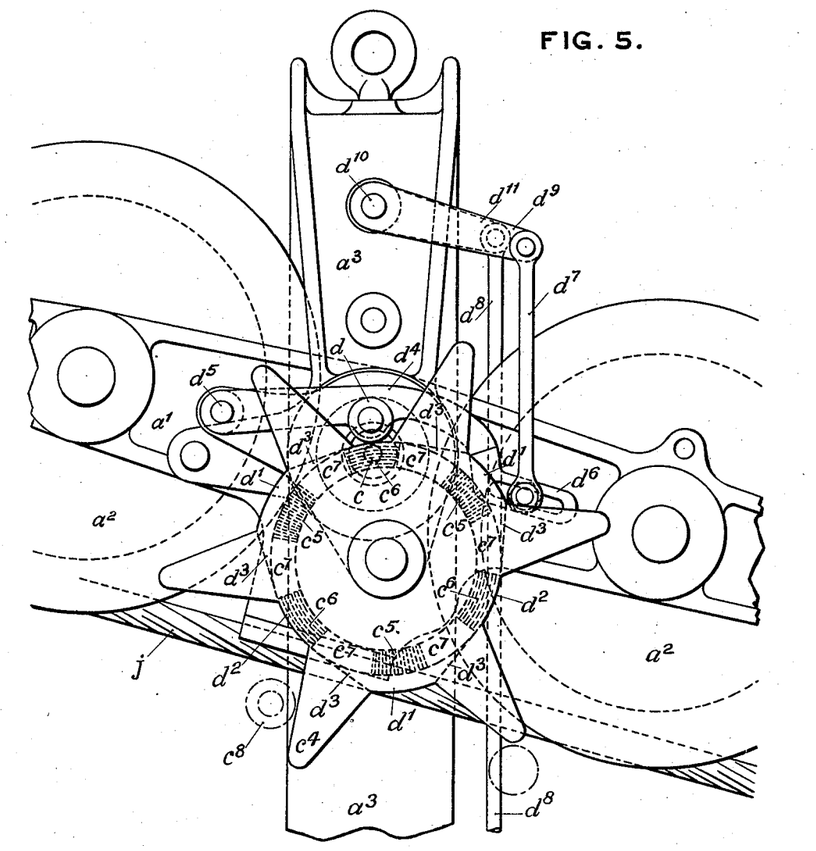
Fig. 5 is a side elevation further illustrative of said disconnecting and connecting means shown in Fig. 4, and its combination with the power control gear.

For the purpose of automatically disengaging the driving and the driven means of the tractor, the hollow shaft $b^{11}$ carries therein a push rod $c$, one end $c^1$ of which faces a stud $c^2$ of the clutch, and the remote end $c^3$ extends beyond the shaft and is adapted to be engaged and disengaged from the star wheel $c^4$ by the annular surface cam thereof with its high and low planes $c^5$ and $c^6$ respectively, made continuous by interposing inclines $c^7$ (see Figs. 4 and 5).

From the foregoing description and reference to the first five figures it will be readily understood that in any particular section of the track system where it is desired to automatically slow down or stop the tractor an arm of the star wheel $c^4$ comes in contact with a stop $c^8$ specially located for this purpose on a track support $l$—Fig. 2— or likewise carried adjacent to the track; the said star wheel $c^4$ is thus partly rotated during its passage, bringing a high plane $c^5$ of the annular surface cam into engagement with the extended end $c^3$ of the push rod $c$ and by having thereby pushed, and by retaining the end $c^1$ against the stud $c^2$ of the clutch, frees the spring-influenced contact of the interposed friction rings $b^7$, $b^8$ of the driving and driven parts respectively of the clutch, and causes the sprocket wheel $b^4$, together with the casing $b^5$ forming the driving part of the clutch, to run free on the ball race $b^9$, thus allowing the motive power agent $a^6$ to run without imparting motion to the carriage; but in order that it shall not be wasteful of motive power when thus running freely, the power-controlling agent $a^8$ automatically decreases the power supply, by its being combinedly arranged to be actuated by the same movement of the star wheel raising a jockey wheel $d$ by means of the star wheel having a like but circumferential cam face composed of corresponding high and low planes $d^1$ and $d^2$ and interposing inclines $d^3$, said jockey wheel $d$ being carried by the lever $d^4$ having a fulcrum pin $d^5$ and provided with an adjustable slotted connection $d^6$ for actuating through the medium of the short vertical rod $d^7$, rocking shaft $d^{10}$, crank arm connections $d^9$, $d^{11}$ and the depending rod $d^8$, the adjustable lever $d^{12}$ of the power-controlling agent $a^8$ through the adjustable connection $d^{13}$, thus economizing the motive power. The three adjustment devices $d^6$, $d^{12}$ and $d^{13}$ insure the required relative angular movement and latitude desired for power control.

It will likewise be readily understood that the powered traveling of the tractor is automatically reëstablished by the star wheel $c^4$ meeting a succeeding stop distantly and similarly located to the preceding stop $c^8$ and being rotated a further part turn, and thus bringing a pair of low planes $c^6$ and $d^2$ of their respective cam surfaces forward, restores the former condition, thereby completing a cycle of operations which automatically connects up, by means of the clutch, the gearing of the motive power agent $a^6$ to the traveling wheels $a^2$ of the tractor; and incidentally augmenting the power supply by the lowering of the jockey wheel $d$ actuating the power-controlling agent $a^8$ through the medium of its before-described connecting system.

Figure 11:
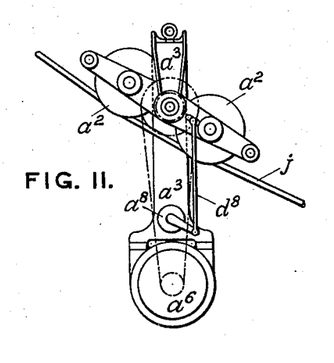
Figs. 11 and 12 are diagrammatic side views of a tractor illustrating the manner in which the gradient of the track is made available for actuating the power control gear.
Figure 12:
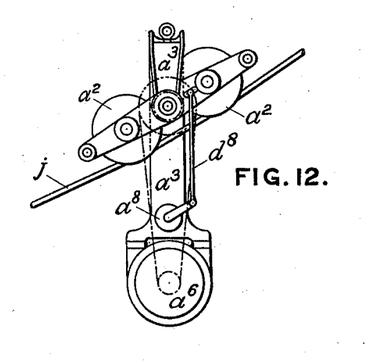

Reference now to the diagrammatic Figs. 11 and 12, which respectively indicate a tractor ascending under augmented motive power, and descending with the power decreased and economized, together with Fig. 5 will make clear how the gradient of the track $j$ through the medium of the carriage $a$, $a^1$ thereon, in its angular relation to the depending hanger $a^3$ is made available for regulating the motive power of the tractor by actuating the power-controlling agent $a^8$ by means of the depending rod $d^8$ which, for this function, may be considered equivalently connected direct to the carriage; and is diagrammatically so indicated in Figs. 11 and 12, it being readily understood that the before-described adjustable slotted lever $d^4$ carrying the jockey wheel $d$ and together with the cam star wheel $c^4$ moves integrally without self actuation as a part of the carriage $a$, $a^1$, as the tractor ascends or descends the catenary of the rope track, and is therefore a combined, but independent device for likewise actuating the power-controlling agent $a^8$ through the same connecting system $d^6$, $d^7$, $d^8$, $d^9$, $d^{10}$, $d^{11}$, $d^{12}$, and $d^{13}$.

Referring again to Figs. 3 and 4, in close proximity to, and immediately surrounding the position occupied by the track rope $j$ and carried midway between and below the two axes of the traveling wheels $a^2$ of the carriage $a$, $a^1$ and occupying the space between the side frames $a$ and $a^1$ under the central pivots $a^4$ and pinion shaft $b^{11}$ and pivotally depending from pivots $e$ of the lever $e^1$ which is connected to the underside of the carriage side-frame $a$ by the fulcrum pin $e^2$ is the track slipper brake $e^3$ for engaging with the underside of the track rope $j$, and it is operated by being raised by the spigot $e^4$ situated at that end of the lever $e^1$ which slides upward between guides $e^5$ of the side-frame $a^1$ traversing the slot $e^6$ of the lever $e^7$ when the said lever $e^7$ is turned about its fulcrum pin $e^8$ through the medium of its pin connection $e^9$ to the adjustable slotted link $e^{10}$, the adjustable end of which is engaged and retarded by the pin $e^{11}$ of the wiper $e^{12}$ outstanding from the boss $e^{13}$ of the pivotally depending hanger $a^3$; the said hanger $a^3$ tending to assume the vertical, while the carriage, carrying with it the track slipper brake lever system and adapting itself to excessive declines of rope track, provides the necessary relative angular movement to operate the foregoing system of levers to apply the brake.

The track slipper brake is enabled to clear the track rope supporting saddles by being deflected sidewise, as indicated by dot-and-dash lines Fig. 4, by its own guiding ramp engaging with and sliding on a mating ramp of the saddle during the passage of the carriage, thus swinging itself at right angles to and clear of the rope track, about the pivots $e$. The track slipper brake combinedly serves to retain the carriage to the rope track whether the brake be applied or free.

The provision of dashpots $f$ pivoted to the carriage side-frames $a$ and $a^1$ having plungers $f^1$ pivotally connected at $f^2$ to the hanger $a^3$ and above the central pivots $a^4$ thereof, is for preventing idle and too sudden oscillating movements of the depending hanger, and thus to make conformable the relative angular movements of the carriage to the depending hanger, for automatically controlling the tractor by means of the before-described devices.

Figure 6:
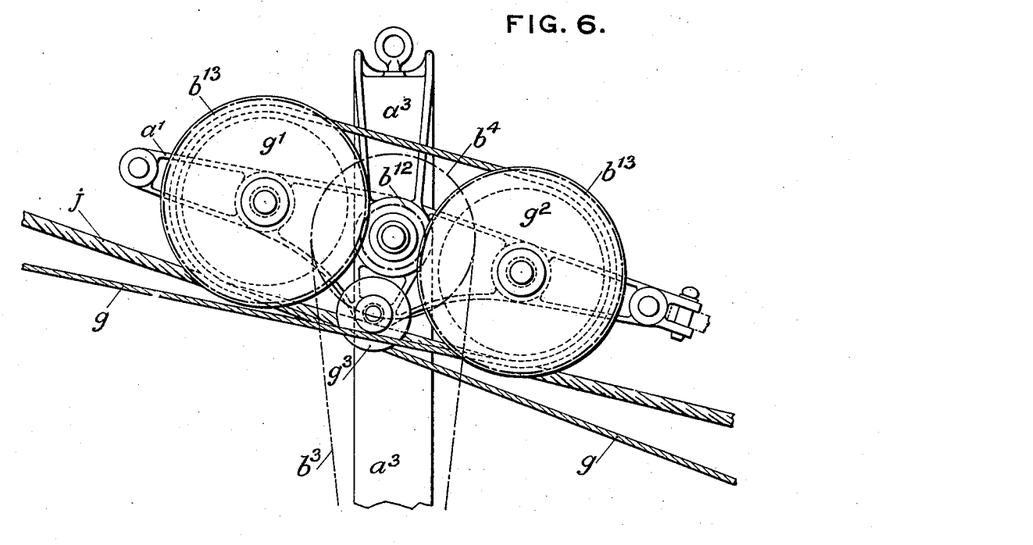
Figs. 6 and 7 are, respectively, side elevation and plan views of a tractor carriage provided with warping sheaves engaging with a supplemental quiescent hauling line rope.
Figure 7:
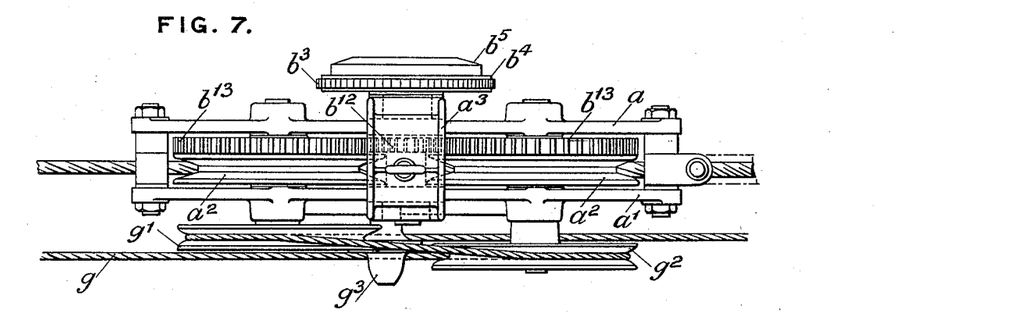

Referring now to Figs. 6 and 7, $g$ is a supplemental quiescent hauling line rope, carried adjacent to the track rope $j$, on that particular side thereof which finds provision for their common support; said hauling rope $g$ engaging with warping sheaves $g^1$ and $g^2$ located on the gapped side of the tractor, and made secure to the power-driven axles of the traveling wheels $a^2$ of the carriage $a$, $a^1$; the hauling rope being wound on and off the warping sheaves $g^1$ and $g^2$, which are stepped in relation, longitudinally, with one another to provide rope clearance. As an additional provision against any possible chafing of the rope where it crosses near itself, a rotatably mounted guide disk $g^3$ is interposed to retain its stepped separation. It will be readily understood that a tractor so equipped hauls itself and provides for traction on severe inclines. I do not, however, confine my invention to the number or form of, or the particular manner described of gearing up and carrying the warping sheaves with the tractor carriage, as this arrangement is capable of extensive modification.

Figures 8, 9:
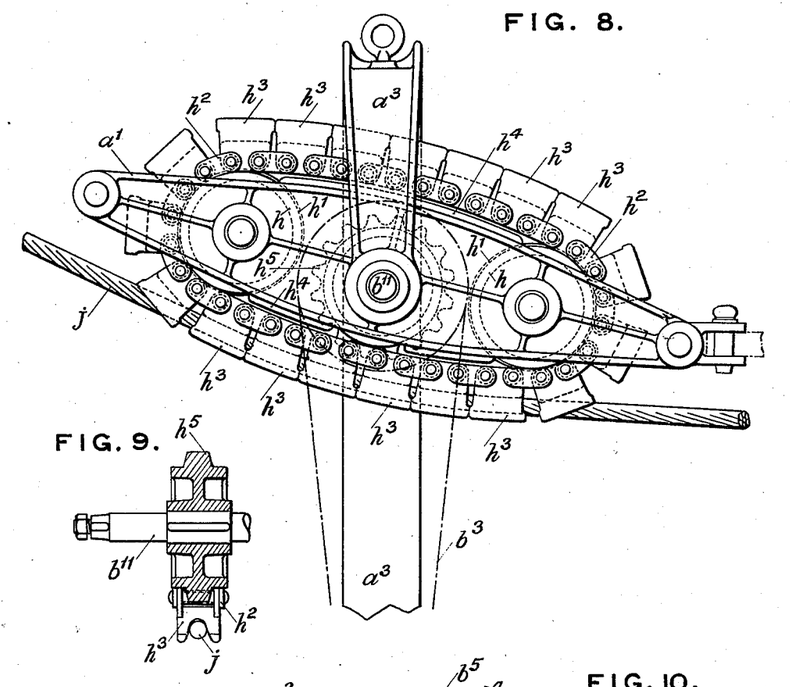
Figs. 8, 9 and 10 are, respectively, side elevation, part sectional and plan views of a tractor carriage provided with a self-laying track.
Figure 10:
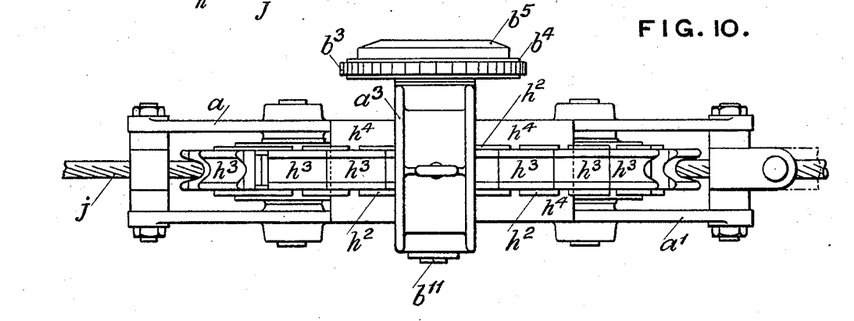

In Figs. 8, 9 and 10, to which I will now refer, the carriage $a$, $a^1$ is provided with two loose-running wheels $h$, without teeth, but having a central flange $h^1$; said wheels carry an endless sprocket roller chain $h^2$, having attached, rope grooved segments $h^3$, which are so constructed as to butt against one another and in such a manner as to provide a longitudinally rigid cambered track surface for engaging by its rope groove, thus made continuous, the track rope $j$. The provision of skates $h^4$ carried across and between the side-frames $a$ and $a^1$ of the carriage, is for the purpose of preventing any undue torsional movement in the chain $h^2$, said skates $h^4$ may be normally clear of the chain $h^2$. Meshing, and in gear with the rollers of the chain $h^2$ is a centrally disposed sprocket wheel $h^5$ which is secured to the power-driven shaft $b^{11}$, which sprocket wheel $h^5$, together with its shaft, forms the axial center of the applied loads transmitted by the hanger $a^3$ and borne by the carriage side-frames $a$ and $a^1$ to the wheels $h$ and the self-laying track $h^2$, $h^3$; this arrangement thus providing for propulsion and for traction on steep gradients, without undue wear of the track rope $j$ resulting.

Figure 13:
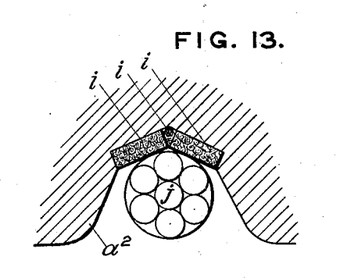
Figs. 13, 14 and 15 are sectional views of the rope-engaging elements or treads, showing the frictional components.
Figure 14:
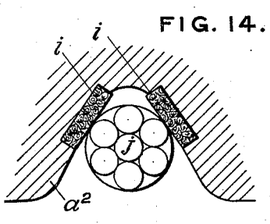
Figure 15:
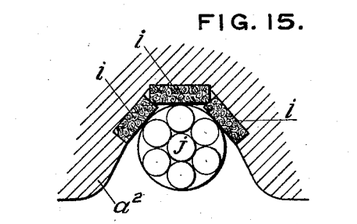

Figs. 13, 14 and 15 are respective alternative methods of arranging circumferential or longitudinal strips of frictional material of sections $i$, said strips being cemented, doweled or otherwise secured in the grooves provided, and are for the purpose of aiding propulsion and traction on the rope track $j$, and for that object are incorporated in the rope grooves of the traveling wheels $a^2$ and their alternative rope-engaging elements.

Having now particularly described and ascertained the nature of my said invention and in what manner the same is to be performed, I declare that what I claim is:—

1. An automatic tractor for elevated trackways including a traveling carriage, a hanger pendulously supported from the carriage, means for propelling the carriage, braking means for arresting the speed of the carriage and normally held in an inoperative position, means for controlling said means for propelling the carriage, and means whereby the relative movement of the carriage and hanger controls said latter means, and also the braking means.

2. A tractor for elevated trackways consisting of a traveling carriage, traction wheels mounted in said carriage, a hanger pendulously supported from the carriage, a power unit mounted on the carriage, a driving connection between the power unit and the traction wheels including a clutch, and means for controlling the operation of the power unit simultaneously with the operation of the clutch.

3. A tractor for elevated trackways consisting of a traveling carriage, traction wheels mounted in said carriage, a hanger pendulously supported from said carriage, a power unit mounted on the carriage, a control device therefor, a driving connection between the power unit and the traction wheels including a clutch, clutch operating means, and means for simultaneously actuating said clutch operating means and the control means for the power unit.

4. A tractor for elevated trackways consisting of a traveling carriage, traction wheels mounted in said carriage, a hanger pendulously supported from the carriage, a power unit mounted on the hanger, control means for the power unit, a driving connection between the power unit and the traction wheels including a clutch, clutch operating means, means for operating the control means for the power unit, and means for automatically and simultaneously operating the clutch operating means and said means for controlling the power unit.

5. A tractor for elevated trackways consisting of a traveling carriage, traction wheels mounted in said carriage, a hanger pendulously supported from the carriage, a power unit mounted on the hanger, and means for driving the traction wheels including a gear located between said traction wheels and adapted to engage the periphery of each, a shaft for said gear, a combined driving sprocket and clutch device carried by said shaft, a driving connection between said sprocket and the power unit, a clutch operating member concentric with the shaft on which the gear is mounted, cam means for automatically shifting the said clutch operating member.

6. A tractor for elevated trackways consisting of a traveling carriage, traction wheels mounted in said carriage, a hanger pendulously supported from said carriage, a power unit mounted in the hanger, a driving connection between the power unit and the traction wheels including an automatically operated clutch, and means for controlling the speed of the power unit including a plurality of connected lever elements, and cam means for actuating one of said lever elements, said cam means being automatically actuated and also adapted to operate the said automatic clutch of the driving connection between the power unit and traction wheels.

7. A tractor for elevated trackways consisting of a traveling carriage, traction wheels mounted on said carriage, a hanger pendulously supported from the carriage, a power unit carried by the carriage, a driving connection between the power unit and the traction wheels including a clutch, control means for the power unit and means for simultaneously actuating the clutch and control means for the power unit consisting of a duplex cam pivotally supported on the carriage and having a plurality of offset abutment engaging members.

8. A tractor for elevated trackways including the combination with the track and fixed abutments located adjacent thereto, of a traveling carriage, traction wheels mounted in said carriage and engaging said track, a hanger pendulously supported from the carriage, a power unit carried by the hanger, a driving connection between the power unit and the traction wheels including a clutch, a clutch operating connection, control means for the power unit, connections for operating said control means, and an actuator member for both the clutch operating member and the means for operating the control means for the power unit, said actuator unit consisting of a rotatably supported star wheel adapted to engage with the abutments in the trackway, and provided with a plurality of cam surfaces for synchronously operating the said clutch and control means for the power unit.

9. A tractor for elevated trackways including the combination with the trackway, of a traveling carriage, traction wheels mounted in said carriage and adapted to travel on said trackway, a hanger pendulously supported from the carriage, a power unit carried by the hanger and operatively connected with the traction wheels, and automatic brake means carried by the carriage and adapted to engage with the trackway when the carriage assumes an oblique position with reference to the pendulously supported hanger.

10. A tractor for elevated trackways including the combination with the trackway, of a traveling carriage, traction wheels mounted in said carriage and adapted to travel on said trackway, a hanger pendulously supported from the carriage, a power unit carried by the hanger and operatively connected with the traction wheels, and brake means carried by the carriage and adapted to engage with the trackway, said brace means consisting of a trackway engaging shoe pivotally mounted on an axis parallel to the trackway, a lever for supporting said shoe, and a link connection between the said lever and the pendulously supported hanger, whereby when the carriage assumes an oblique position with reference to the pendulously supported hanger the brake shoe will automatically grip the trackway.

11. A tractor for elevated trackways including the combination with the trackway, of a traveling carriage, traction wheels mounted in said carriage and adapted to travel on said trackway, a hanger pendulously supported from the carriage, a power unit carried by the hanger and operatively connected with the traction wheels, and brake means carried by the carriage adapted to engage with the trackway, said brake means consisting of a track engaging shoe mounted on an axis parallel with the track, a lever frame disposed transversely of the trackway and having the axis of the brake shoe journaled therein, a spring for maintaining the brake shoe in its normal position, and an operative connection between said lever frame and the pendulously supported hanger whereby relative movement between the carriage and hanger will cause the shifting of the lever frame and consequent application of the brake shoe.

12. A tractor for elevated trackways consisting of a wheeled carriage adapted to travel on said trackway, a hanger pendulously supported from said carriage and carrying a power plant for propelling the wheeled carriage, and means carried by the carriage and connected with the pendulous hanger at one side of its axis for preventing undue oscillation of the carriage with reference to the hanger, or vice versa.

13. A tractor for elevated trackways consisting of a wheeled carriage adapted to travel on said trackway, a hanger pendulously supported from the carriage, and having a power plant mounted thereon for propelling the wheeled carriage, draw-bar means on the carriage for facilitating its connection with another tractor or device to be pulled along the trackway, and a spherical trunnion coupling carried by the hanger for attaching or supporting load carrying devices.

14. A tractor for elevated trackways consisting of a wheeled carriage adapted to travel on said trackway, a hanger pendulously supported from said carriage, a power plant carried by the hanger, control means for the power plant carried by the hanger, and an operative connection between the frame of the carriage and said control means, whereby the relative movement of the carriage with reference to the pendulous hanger will govern the control means for the power unit.

15. A tractor for elevated trackways consisting of a traveling carriage and a hanger pendulously supported therefrom, traction wheels mounted in said carriage and provided with traction grooves for straddling the trackway, said traction grooves being provided with recesses in the opposite side walls thereof, and anti-slipping tread means fitted in said recesses.

16. A tractor for elevated trackways including a traveling carriage, traction wheels journaled in said carriage, a hanger pendulously supported from the carriage, a power unit carried by the hanger and operatively connected with the traction wheels, and warping sheaves mounted on the axles of the traction wheels.

In testimony whereof I have affixed my signature this 24th day of September, 1918.

WILLIAM HUGH WATKINS.

Copies of this patent may be obtained for five cents each, by addressing the "Commissioner of Patents, Washington, D. C."